United States Patent
Chen et al.

(10) Patent No.: US 11,087,519 B2
(45) Date of Patent: Aug. 10, 2021

(54) FACIAL ANIMATION IMPLEMENTATION METHOD, COMPUTER DEVICE, AND STORAGE MEDIUM

(71) Applicant: Tencent Technology (Shenzhen) Company Limited, Shenzhen (CN)

(72) Inventors: Jingcong Chen, Shenzhen (CN); Xinliang Wang, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 6 days.

(21) Appl. No.: 16/509,305

(22) Filed: Jul. 11, 2019

(65) Prior Publication Data
US 2019/0333262 A1    Oct. 31, 2019

Related U.S. Application Data

(63) Continuation of application No. PCT/CN2018/083326, filed on Apr. 17, 2018.

(30) Foreign Application Priority Data

May 12, 2017  (CN) .......................... 201710335509.5

(51) Int. Cl.
*G06T 13/40*    (2011.01)
*G06F 3/01*    (2006.01)
(Continued)

(52) U.S. Cl.
CPC .............. *G06T 13/40* (2013.01); *G06F 3/013* (2013.01); *G06K 9/00288* (2013.01); *G06K 9/00308* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 2003/0133599 A1* | 7/2003 | Tian | ................... G06K 9/00308 382/118 |
| 2008/0063263 A1* | 3/2008 | Zhang | ................... G06K 9/6209 382/159 |

(Continued)

FOREIGN PATENT DOCUMENTS

| | | |
|---|---|---|
| CN | 101354795 A | 1/2009 |
| CN | 102157010 A | 8/2011 |

(Continued)

OTHER PUBLICATIONS

Narendra Patel, Mukesh Zaveri, "3D Facial Model Construction and Animation From a Single Frontal Face Image," 2011, International Conference on Communications and Signal Processing, pp. 203-207 (Year: 2011).*

(Continued)

*Primary Examiner* — Michael J Cobb
(74) *Attorney, Agent, or Firm* — Morgan, Lewis & Bockius LLP

(57) ABSTRACT

This application provides a facial animation implementation method performed at a computing device. The method includes: capturing a facial image; extracting facial feature points in the facial image; comparing the facial feature points with standard feature points, to obtain a first deformation coefficient corresponding to a geometrical feature; extracting a local region according to the facial feature points for processing, to obtain a second deformation coefficient corresponding to an appearance feature; and driving a three-dimensional virtual object according to the first (Continued)

deformation coefficient and the second deformation coefficient to perform a corresponding expression.

14 Claims, 11 Drawing Sheets

(51) Int. Cl.
*G06K 9/00* (2006.01)
*G06K 9/62* (2006.01)

(56) References Cited

U.S. PATENT DOCUMENTS

| | | | | |
|---|---|---|---|---|
| 2012/0141018 | A1* | 6/2012 | Shiell | G06K 9/621 |
| | | | | 382/159 |
| 2013/0201187 | A1* | 8/2013 | Tong | G06K 9/6255 |
| | | | | 345/420 |
| 2014/0362091 | A1* | 12/2014 | Bouaziz | G06T 15/503 |
| | | | | 345/473 |
| 2015/0035825 | A1 | 2/2015 | Zhou et al. | |
| 2015/0213604 | A1* | 7/2015 | Li | G06K 9/00315 |
| | | | | 345/473 |
| 2015/0242707 | A1* | 8/2015 | Wilf | G06K 9/6256 |
| | | | | 382/159 |
| 2016/0006987 | A1* | 1/2016 | Li | H04L 12/1827 |
| | | | | 348/14.03 |
| 2017/0300741 | A1* | 10/2017 | Seuss | G06K 9/00315 |
| 2019/0213772 | A1* | 7/2019 | Lombardi | G06T 15/205 |
| 2020/0051303 | A1* | 2/2020 | Li | G06T 17/20 |

FOREIGN PATENT DOCUMENTS

| | | | |
|---|---|---|---|
| CN | 102376100 | A | 3/2012 |
| CN | 102393951 | A * | 3/2012 |
| CN | 102479388 | A | 5/2012 |
| CN | 104599309 | A | 5/2015 |
| CN | 105139438 | A | 12/2015 |
| CN | 106056650 | A | 10/2016 |
| WO | WO 2014195018 | A1 | 12/2014 |

OTHER PUBLICATIONS

Tencent Technology, ISRWO, PCT/CN2018/083326, dated Jul. 31, 2018, 6 pgs.

Tencent Technology, IPRP, PCT/CN2018/083326, dated Nov. 12, 2019, 5 pgs.

Lei Teng, The Study of Virtual Human's Eye Movement and Facial Expression Synthesis, Sep. 15, 2014, Abstract only, retrieved from: http://oversea.cnki.net/kcms/detail/detail.aspx?dbcode=CMFD&QueryID=11&CurRec=6&dbname=CMFD201402&filename=1014254693.nh.

* cited by examiner

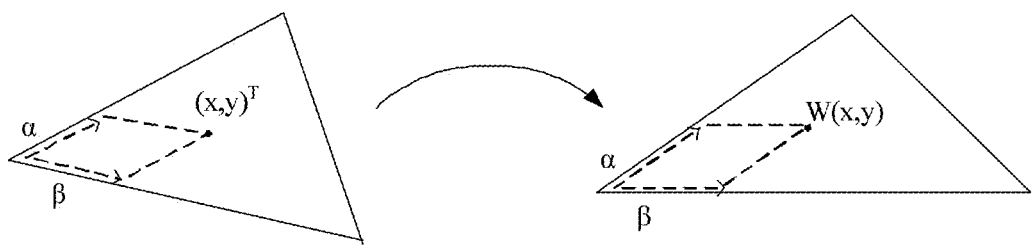
FIG. 8
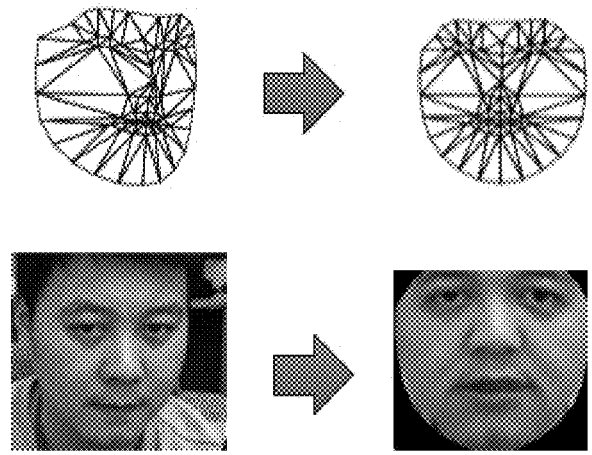
FIG. 9
1002
Determine an identification result corresponding to the local region by using a trained classifier according to the texture feature, where the classifier is obtained by learning a texture feature in a labeled sample
1004
Determine the third deformation coefficient corresponding to the texture feature according to the identification result
FIG. 10

FACIAL ANIMATION IMPLEMENTATION METHOD, COMPUTER DEVICE, AND STORAGE MEDIUM

CROSS-REFERENCE TO RELATED APPLICATIONS

This application is a continuation application of PCT/CN2018/083326, entitled "FACIAL ANIMATION IMPLEMENTATION METHOD, COMPUTER DEVICE, AND STORAGE MEDIUM" filed on Apr. 17, 2018, which claims priority to Chinese Patent Application No. 201710335509.5, entitled "FACIAL ANIMATION IMPLEMENTATION METHOD AND APPARATUS, COMPUTER DEVICE, AND STORAGE MEDIUM" filed with the China National Intellectual Property Administration on May 12, 2017, all of which are incorporated by reference in their entirety.

FIELD OF THE TECHNOLOGY

This application relates to the field of computer processing, and in particular, to a facial animation implementation method, a computer device, and a storage medium.

BACKGROUND OF THE DISCLOSURE

Facial animation is a technology for capturing facial expressions through an expression capture sensor and mapping and transferring the facial expressions to a virtual animated character. The technology has been widely applied to fields such as movies and games and further has a wide application prospect with development of virtual reality (VR) and augmented reality (AR) technologies in recent years. A conventional facial animation implementation method either uses expensive devices (for example, based on a depth camera) and cannot be easily applied to a common consumption field, or has poor identification accuracy, usually requires a user to perform a series of presets before use, for example, inputting photos of different postures and expressions, and requires complicated operations, which raises a user threshold to some extent.

SUMMARY

Embodiments of this application provide a facial animation implementation method, a computer device, and a storage medium.

According to a first aspect of this application, an embodiment of this application provides a facial animation implementation method performed at a computer device having one or more processors and memory storing a plurality of programs to be executed by the one or more processors, the method comprising:

capturing, by a computer device, a facial image of a person;

extracting, by the computer device, facial feature points in the facial image;

comparing, by the computer device, the facial feature points with standard feature points, to obtain a first deformation coefficient corresponding to a geometrical feature;

extracting, by the computer device, a local region according to the facial feature points for processing, to obtain a second deformation coefficient corresponding to an appearance feature; and driving, by the computer device, a three-dimensional virtual object according to the first deformation coefficient and the second deformation coefficient to perform a corresponding expression represented by the facial image of the person.

According to a second aspect of this application, an embodiment of this application provides a computing device comprising one or more processors, memory coupled to the one or more processors and a plurality of programs stored in the memory that, when executed by the one or more processors, cause the computing device to perform the aforementioned facial animation implementation method.

According to a third aspect of this application, an embodiment of this application provides a non-transitory computer readable storage medium storing a plurality of machine readable instructions in connection with a computing device having one or more processors. The plurality of machine readable instructions, when executed by the one or more processors, cause the terminal to perform the aforementioned facial animation implementation method.

The details of one or more embodiments of this application are disclosed in the following accompanying drawings and description. Other features, objectives, and advantages of this application become clearer from the specification, the accompanying drawings, and the claims.

BRIEF DESCRIPTION OF THE DRAWINGS

To describe the technical solutions in the embodiments of this application or in the existing technology more clearly, the following briefly introduces the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

FIG. 8 is a schematic diagram of performing affine warping on a triangle according to an embodiment.

FIG. 9 is a schematic diagram of converting to a standard facial image according to an embodiment.

FIG. 10 is a flowchart of a method for determining a third deformation coefficient corresponding to a local region based on a texture feature according to an embodiment.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe this application, instead of limiting this application.

Figure 1:
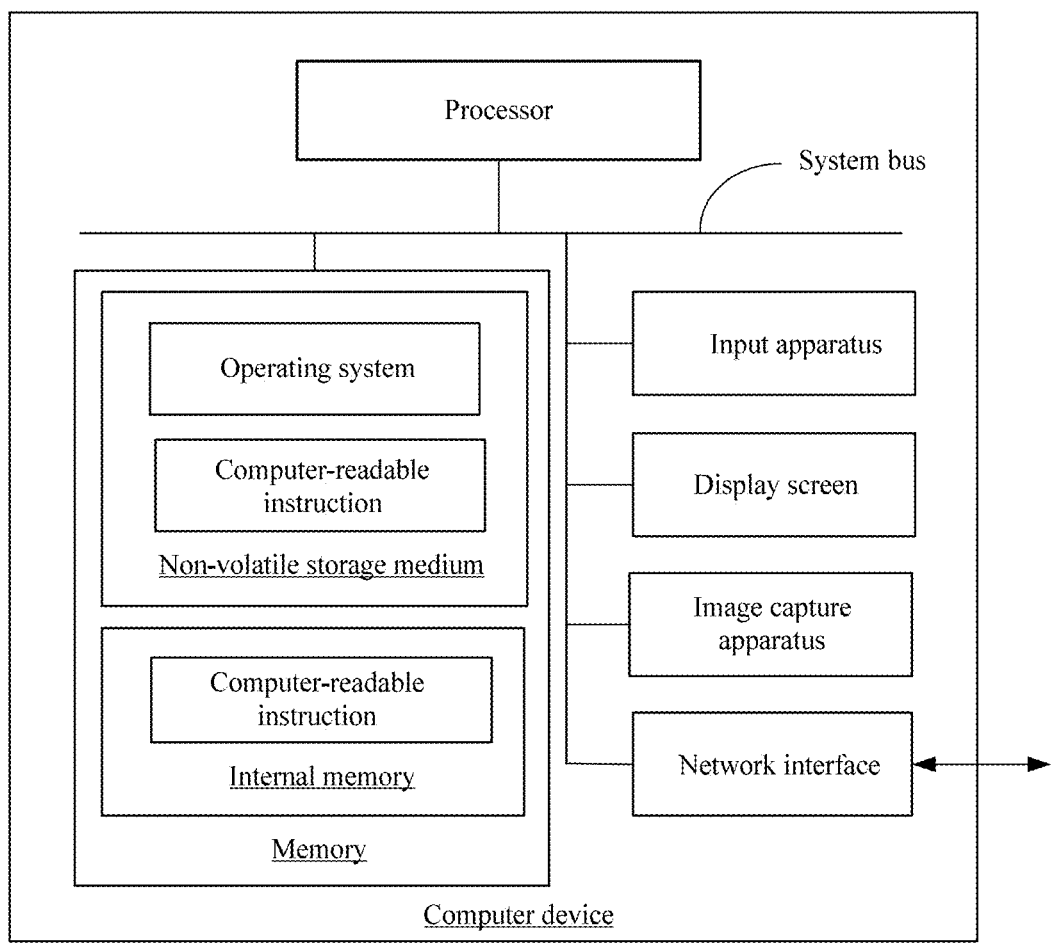
FIG. 1 is a schematic diagram of an internal structure of a computer device according to an embodiment.

FIG. 1 is a schematic diagram of an internal structure of a computer device according to an embodiment. The computer device may be a terminal, the terminal may be a personal computer or a mobile electronic device, and the mobile electronic device includes at least one of a mobile phone, a tablet computer, a personal digital assistant, and a wearable device. Referring to FIG. 1, the computer device includes a processor, a network interface, a display screen, an input apparatus, and an image capture apparatus connected through a system bus. A memory includes a non-volatile storage medium and an internal memory. The non-volatile storage medium of the computer device may store an operating system and computer-readable instructions. The computer-readable instructions, when being executed by the processor, cause the processor to perform a facial animation implementation method. The processor of the computer device is configured to provide computation and control capabilities, to support operation of the entire computer device. The internal memory may store computer-readable instructions. The computer-readable instructions, when being executed by the processor, cause the processor to perform a facial animation implementation method. The network interface of the computer device is configured to perform network communication. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like. The touch layer and the display screen form a touch screen. The image capture apparatus may be a camera. A person skilled in the art may understand that, the structure shown in FIG. 1 is merely a block diagram of a partial structure related to a solution in this application, and does not constitute a limitation to the computer device to which the solution in this application is applied. Specifically, the computer device may include more or fewer components than those shown in the figure, or have some components combined, or have a different component deployment.

Figure 2:
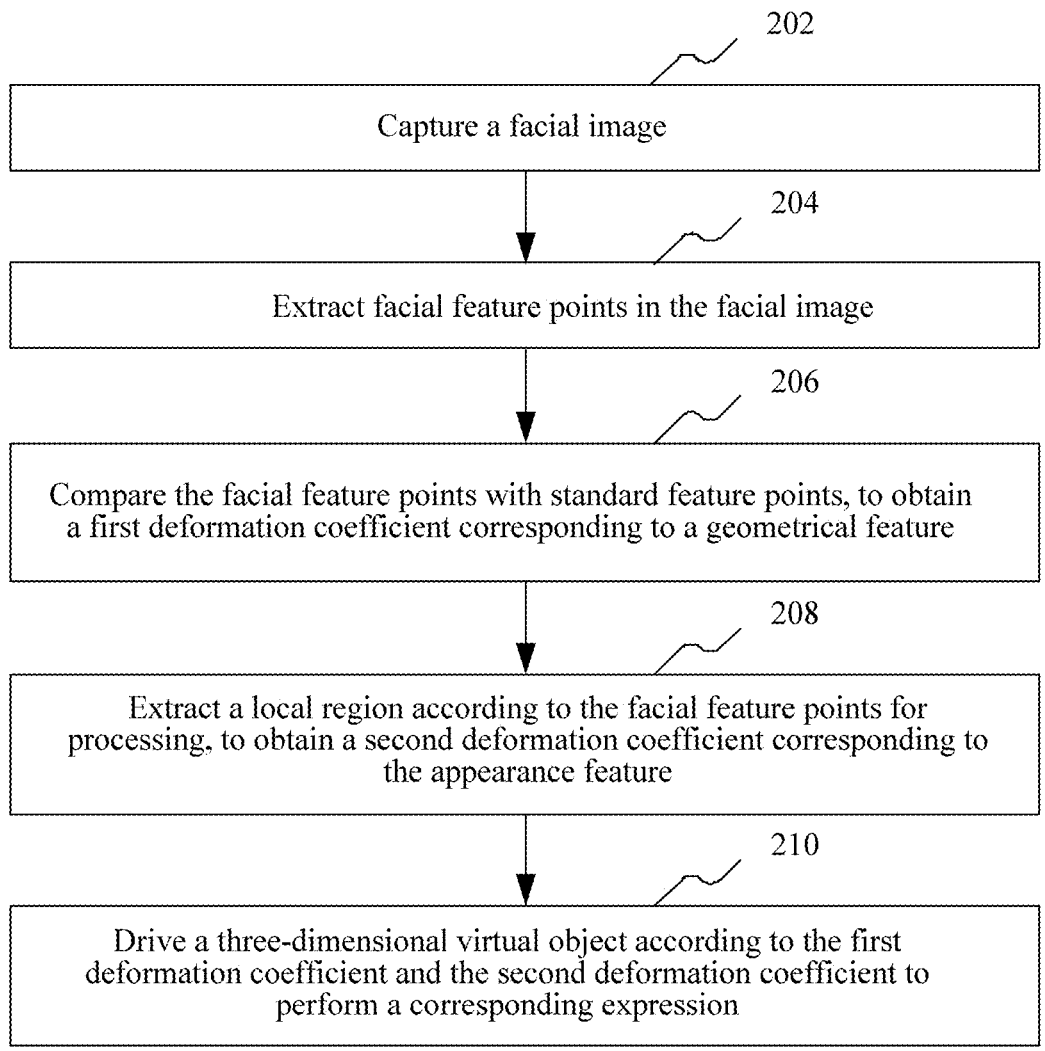
FIG. 2 is a flowchart of a facial animation implementation method according to an embodiment.

As shown in FIG. 2, in an embodiment, a facial animation implementation method is provided. The method is applied to a computer device, and specifically includes the following steps:

Step 202: Capture a facial image.

In an embodiment, the facial image refers to an image containing face information. The facial image may be captured through a front or a rear camera in a terminal. The facial image may be captured by taking a photo or shooting a video, because the video is composed of image sequences.

Step 204: Extract facial feature points in the facial image.

Figure 3:
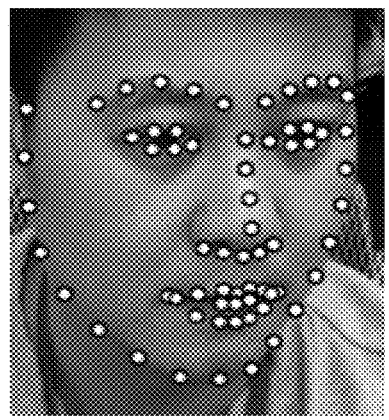
FIG. 3 is a schematic diagram of facial feature points obtained through marking and positioning according to an embodiment.

In an embodiment, facial feature points are also called facial key points, and refer to face positions capable of reflecting expressions and states, including, but not limited to, face positions such as eyes, a mouth, a nose, and eyebrows. A face marking and positioning technology may be used to extract the facial feature points in the facial image, specifically in two steps, one step is face detection, and the other step is face marking. First, a rough position of a face, generally a rectangular frame that frames the face, in an image is obtained through the face detection, then, based on the rectangular frame, more precise positions are searched for through the face marking, and then coordinates of positions of a series of facial feature points are returned. FIG. 3 is a schematic diagram of facial feature points obtained through marking and positioning according to an embodiment. A face marking and positioning method may be an existing method, for example, Active Appearance Models (AAM) and Ensemble of Regression Tree (ERT). The face marking and positioning method is not limited herein.

Step 206: Compare the facial feature points with standard feature points, to obtain a first deformation coefficient corresponding to a geometrical feature.

In an embodiment, the geometrical feature refers to a feature obtained when the facial feature points is subject to a geometrical deformation, for example, when a mouth is opened, the facial feature points near the mouth may be displaced and deformed obviously. A change of the geometrical feature of the face needs to be obtained through comparing the facial feature points with the standard feature points, that is, a reference value is required. To better reflect a change of a facial expression, facial feature points corresponding to a neutral face are used as the standard feature points, and the neutral face refers to a facial state in which a person has no expressions. Displacements and deformations of parts of the face may be obtained through comparing the facial feature points with the standard feature points corresponding to the neutral face, to further determine deformation coefficients corresponding to the parts, for example, an eyebrow raising coefficient and a mouth opening coefficient. The deformation coefficients corresponding to the parts are deformation coefficients corresponding to the geometrical feature, and are referred to as "the first deformation coefficient", to be distinguished from deformation coefficients corresponding to an appearance feature that will be described below.

Step 208: Extract a local region according to the facial feature points for processing, to obtain a second deformation coefficient corresponding to an appearance feature.

In an embodiment, the appearance feature refers to a change of the face in an appearance and cannot be easily identified by using the geometrical feature. For example, blinking, sticking out a tongue, and the like cannot be identified by using the geometrical feature. Therefore, an appearance feature based identification method needs to be used to identify a change in the appearance feature. To identify the appearance feature more precisely, a local facial image may be extracted to identify the appearance feature. A corresponding deformation coefficient is determined according to the identified change of the appearance feature, and is referred to as "the second deformation coefficient". Specifically, the local region is extracted according to the facial feature points, then, a texture feature corresponding to the local region is computed, and a trained classification module is used to predict an identification result corresponding to the local region according to the texture feature. For example, an eye region is extracted, whether the eyes are opened or closed is predicted according to a texture feature of the extracted eye region, to determine a corresponding deformation coefficient, if the eyes are closed, the deformation coefficient is set to 0, and if the eyes are opened, the deformation coefficient is set to 100. The local region that cannot be easily identified by the geometrical feature is extracted and the extracted local region is processed by using a method about an appearance feature, to make up for the deficiency of the geometrical feature based identification. The geometrical feature based identification and the appearance feature based identification are combined, to improve precision and accuracy of expression identification.

Step 210: Drive a three-dimensional virtual object according to the first deformation coefficient and the second deformation coefficient to perform a corresponding expression.

In an embodiment, the three-dimensional virtual object refers to network virtual animation (Avatar), and Avatar is a 3D character. The three-dimensional virtual object may be a cartoon character or a real character that is really restored. A captured facial expression is displayed through the three-dimensional virtual object. The first deformation coefficient and the second deformation coefficient obtained through computation are used as deformation parameters of a three-dimensional virtual object model, to control the three-dimensional virtual object to perform a corresponding expression. Specifically, the first deformation coefficient and the second deformation coefficient obtained through identification are used to control the face of the three-dimensional virtual object to perform a corresponding expression, for example, perform an expression such as smiling, opening a mouth, or blinking. That is, the face of the three-dimensional virtual object is controlled to perform a corresponding expression by an animation rendering engine using deformation coefficients obtained through identifying real facial expressions, to really restore the facial expressions to the face of the three-dimensional virtual object (Avatar).

In an embodiment, the expression of the three-dimensional virtual object is controlled by values corresponding to several Blendshapes (expression deformations). Blendshape is used to control a facial detail expression, and generally, dozens of Blendshapes may be set for a face. Each Blendshape controls only one facial detail, for example, eye corners, mouth, mouth corners, and the like can be controlled by different Blendshapes. A value range of each Blendshape is 0-100, for example, the Blendshape for controlling eyelids means that the eyes are closed when the value is 0 and means that the eyes are fully opened when the value is 100. A very complicated facial expression may be synthesized by combining dozens of Blendshapes. The facial image identifying process is to determine Blendshape values corresponding to parts of the face and obtain more accurate identification effects by combining the geometrical feature and the appearance feature, thereby driving the three-dimensional virtual object according to the first deformation coefficient and the second deformation coefficient to perform a subtler expression.

In an embodiment, to avoid large-scale jitter, before the three-dimensional virtual object is controlled according to the first deformation coefficient and the second deformation coefficient to perform a corresponding expression, smoothing processing further needs to be performed on the obtained first deformation coefficient and second deformation coefficient, for example, a least squares filter may be used to perform smoothing processing on the corresponding deformation coefficients.

In an embodiment, a facial image is captured through a camera, facial feature points in the facial image are extracted, and the facial feature points are compared with standard feature points of a neutral face to obtain a first deformation coefficient corresponding to a geometrical feature. Since the geometrical feature based identification method cannot identify some regions or cannot identify some regions accurately, a local region needs to be extracted according to the facial feature points for processing, to obtain a second deformation coefficient corresponding to an appearance feature. Then, the three-dimensional virtual object is driven according to both the first deformation coefficient and the second deformation coefficient to perform a corresponding expression. In the entire process, a user does not need to provide any preset value, the operation is simple and convenient, a more accurate identification effect can be obtained in combination with more precise identification of an appearance feature, and the method can be implemented only by an ordinary monocular camera, thereby greatly reducing use costs.

Figure 4:
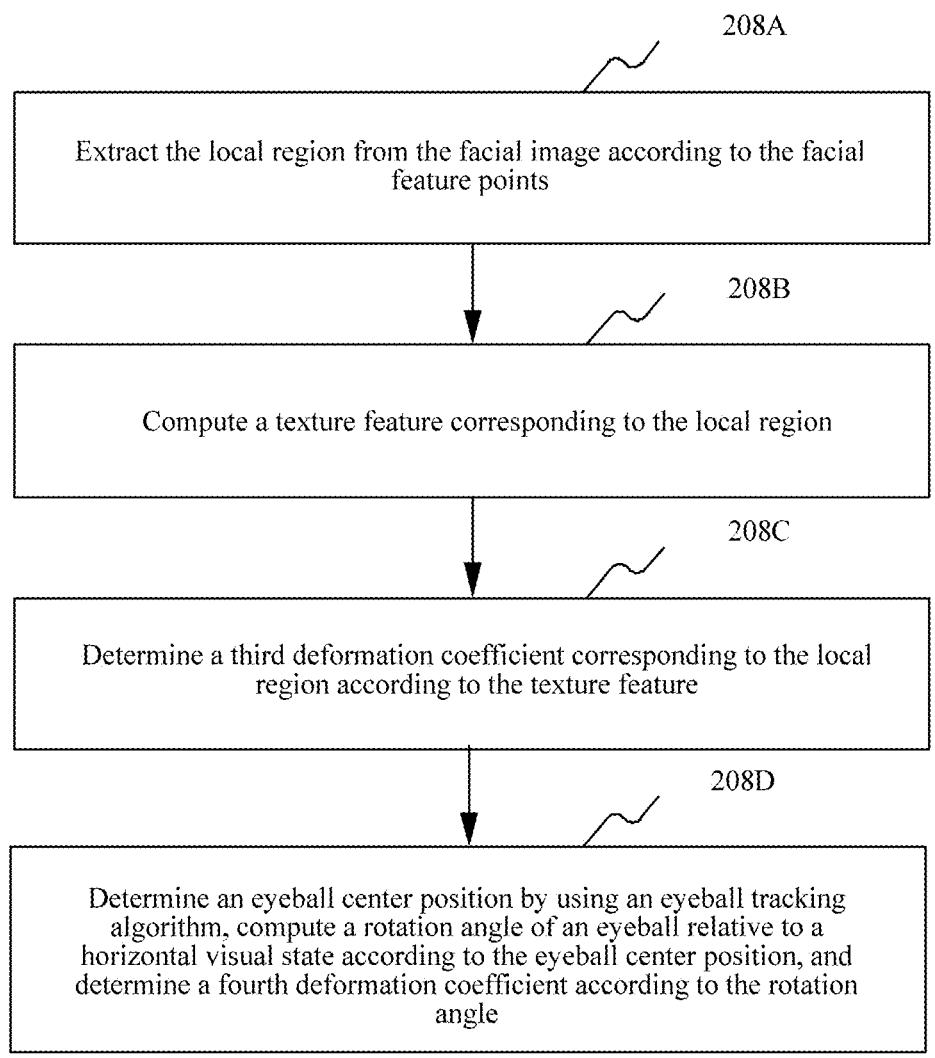
FIG. 4 is a flowchart of a method for extracting a local region according to facial feature points for processing to obtain a second deformation coefficient corresponding to an appearance feature through according to an embodiment.

As shown in FIG. 4, in an embodiment, the second deformation coefficient includes a third deformation coefficient and a fourth deformation coefficient. Step 208, that is, extracting a local region according to the facial feature points for processing, to obtain a second deformation coefficient corresponding to an appearance feature, includes the following steps:

Step 208A: Extract the local region in the facial image according to the facial feature points.

In an embodiment, since the geometrical feature is identified based on a geometrical deformation of the facial feature points, subtler expressions, for example, blinking, sticking out a tongue, and the like, cannot be easily identified. Therefore, the appearance features of the regions that cannot be easily identified need to be identified. Since the facial feature points may mark positions of a face, including positions of eyes, a mouth, a nose, eyebrows, and the like, a corresponding local region may be extracted from the facial image according to the facial feature points, for example, an eye region can be extracted, and a left-eye region and a right-eye region can be extracted respectively.

Step 208B: Compute a texture feature corresponding to the local region.

Figure 5:
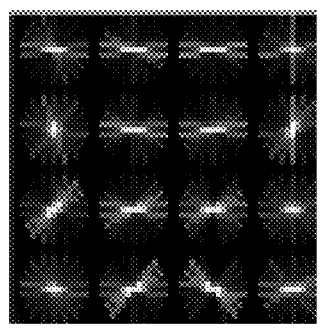
FIG. 5 is a schematic diagram of a Histogram of Oriented Gradient (HOG) feature of a left-eye local region according to an embodiment.

In an embodiment, the texture feature refers to a feature parameter that is extracted by using a certain image processing technology and that can represent attributes of an image, and the feature parameter is used to describe information about the image. After a to-be-identified local region is extracted from the facial image, the texture feature corresponding to the local region is computed, so that classification is performed according to the texture feature. In an embodiment, a Histogram of Oriented Gradient (HOG) feature may be used as the texture feature of the local region. The HOG feature is a feature descriptor for performing object detection in computer vision and image processing, and is formed by computing and collecting statistics about HOGs of a local region of an image. In an image, an appearance and a shape of a local target can be described well by density distribution in a gradient or an edge direction. FIG. 5 shows a visualization result obtained through computing an HOG feature of a left-eye local image (the left eye is closed) according to an embodiment. As shown in FIG. 5, there are more gradient distributions in a horizontal direction in a central region, and an obvious horizontal edge exists in the middle of the image with the closed eye. Therefore, the HOG feature can well reflect the texture feature of the local region of the image.

Step 208C: Determine the third deformation coefficient corresponding to the local region according to the texture feature.

In an embodiment, after the texture feature corresponding to the local region is obtained through computation, an appearance feature is predicted for the local region by using a trained classifier according to the texture feature, where the classifier is obtained by learning a texture feature in a labeled sample. For example, if the local region is eyes, the trained classifier may be used to predict whether the eyes are closed according to the obtained texture feature, to determine the third deformation coefficient corresponding to the local region. If the result is that the eyes are closed, the corresponding deformation coefficient may be set to 0, and if the result is that the eyes are opened, the corresponding deformation coefficient may be set to 100.

Step 208D: Determine an eyeball center position by using an eyeball tracking algorithm, compute a rotation angle of an eyeball relative to a horizontal visual state according to the eyeball center position, and determine the fourth deformation coefficient according to the rotation angle.

Figure 6:
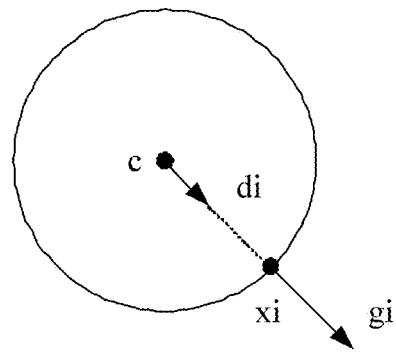
FIG. 6 is a schematic diagram of determining an eyeball center position according to an embodiment.
Figure 7:
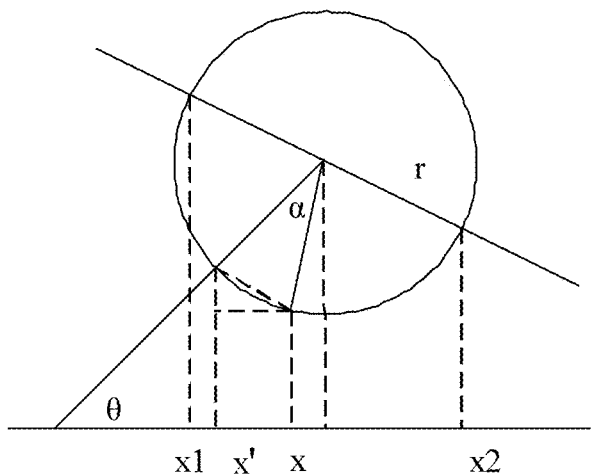
FIG. 7 is a schematic diagram of computing a rotation angle of an eyeball according to an embodiment.

In an embodiment, to identify a corresponding expression more vividly, the identification of the appearance feature further includes identifying rotation of an eyeball, taking the eyeball in the horizontal visual state of an eye as a reference standard, determining the eyeball center position by using the eyeball tracking algorithm, and computing a rotation angle of the eyeball relative to the horizontal visual state according to the eyeball center position, for example, obtaining through computation that the left eyeball rotates by 25 degrees on the x-axis and 5 degrees on the y-axis. The fourth deformation coefficient is determined according to the rotation angles, for example, 25 and 5 are directly used as deformation coefficients. In an embodiment, first, the eyeball center position is determined. As shown in FIG. 6, in a situation that the eyeball center is not known, it is assumed that c is a possible eyeball center and gi is a gradient vector of a position xi. If c is the eyeball center, the vector di from c to xi and gi are in the same direction. An angle between the vectors di and gi may be represented by a dot product, the iris of the eyeball is an approximate circle, and then, a point c* corresponding to a maximum sum of dot products of di and gi obtained through computation is a center of the iris, that is, the center of the eyeball. This is represented by the following mathematical formula:

$$c^* = \underset{c}{\mathrm{argmax}} \left\{ \frac{1}{N} \sum_{i=1}^{N} (d_i^T g_i)^2 \right\},$$

where $d_i^T$ represents a transpose matrix. Secondly, a maximum value obtained through the target function is only a center of the eyeball center position on a 2D image, and on the basis of this, the rotation angle α of the eyeball further needs to be estimated. In an embodiment, as shown in FIG. 7, it is assumed that an eyeball model is an approximate sphericity, the camera is a weak perspective model based on a pinhole, a rotation angle of a head relative to a perpendicular direction (y-axis) of a focal plane of the camera is θ, projection coordinates of the eye corners in an X direction are x1 and x2, a projection of the center of the eyeball in a horizontal visual state in an X direction of the focal plane is x', and a projection of the center of the eyeball in a rotation state in the X direction of the focal plane is x. Assuming that the radius of the eyeball is r, α can be obtained by using geometry, and the formula is as follows:

$$\alpha = a\cos\left(\frac{1}{2r}\left(x - \frac{x_1 + x_2}{2} + r\cos\theta\right) + \frac{\cos\theta}{2}\right) - \theta,$$

where a is a constant, and α is the obtained rotation angle on the X-axis. Based on the same method, a rotation angle on the Y-axis may be obtained, and a corresponding fourth deformation coefficient is determined according to the rotation angles obtained through computation.

In an embodiment, step 208A, that is, extracting the local region from the facial image according to the facial feature points, includes: converting the facial image to a standard facial image by using Piecewise Affine Warping according to the facial feature points and extracting the local region from the standard facial image. Piecewise Affine Warping is a well-known spatial domain method used for image enhancement by manipulation of an image so that the result is more suitable than the original for a specific application.

In an embodiment, since facial images have different angles and postures and robustness of image processing becomes poor if the images are directly used, a facial image needs to be converted to a standard facial image through transformation, that is, the facial image is transformed to a standard shape and then a local region of the image is extracted.

The facial image may be converted to a standard facial image by using a Piecewise Affine Warping method according to the facial feature points.

In an embodiment, quantities of facial feature points extracted for different facial images are the same, for example, a quantity of facial feature points that may be extracted is set to 68. Then, standard triangular grids corresponding to a standard facial image may be preset according to a preset division rule, and after the facial feature points of the facial image are extracted, triangular grids corresponding to the facial feature points are obtained through division based on a same connection rule according to the facial feature points. Since the division manners are the same, the triangular grids and the standard triangular grids are in a one-to-one correspondence. Affine warping is performed on pixels of each triangle, that is, each pixel (x, y)$^T$ of a source triangular grid is converted to W (x, p) through affine warping. FIG. 8 is a schematic diagram of performing affine warping on a triangle according to an embodiment. The captured facial image may be converted to a standard facial image through performing affine warping on pixels of each triangle. As shown in FIG. 9, the upper portion is a schematic diagram of converting the triangular grids corresponding to the facial feature points to standard triangular grids according to an embodiment, and the lower portion is a schematic diagram of converting a corresponding facial image to a standard facial image.

As shown in FIG. 10, in an embodiment, step 208C, that is, determining the third deformation coefficient corresponding to the local region according to the texture feature, includes the following steps:

Step 1002: Determine an identification result corresponding to the local region by using a trained classifier according to the texture feature, where the classifier is obtained by learning a texture feature in a labeled sample.

In an embodiment, after the texture feature corresponding to the local region is obtained through computation, a pre-trained classifier is used to predict the identification result corresponding to the local region according to the obtained texture feature. The classifier is obtained by learning a texture feature in a labeled sample. By discovering a rule therein, a type of a new sample is further predicted according to the learned rule. In an embodiment, the appearance feature-based prediction may be regarded as a dichotomous issue, for example, whether eyes are closed and whether a tongue is stuck out. There are many methods for establishing a classifier, for example, algorithms such as a decision tree, a support vector machine (SVM), and a neural network may be used to establish the classifier.

Figure 11:
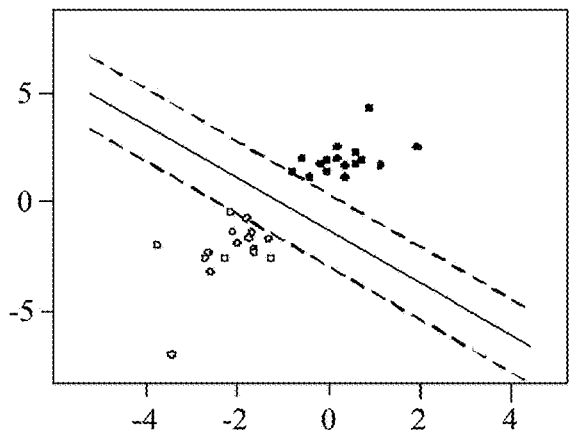
FIG. 11 is a schematic diagram of a principle of an SVM classifier according to an embodiment.

An SVM classifier is used as an example to describe how to establish a classifier. First, a training sample is obtained. Each sample is marked with a type to which it belongs. For example, a facial image is a sample. Whether eyes in the facial image are closed is a corresponding mark. To improve robustness of prediction, in an embodiment, the sample needs to be pre-processed. The pre-processing includes performing mirroring processing (rotation in a Y-axis direction) on the extracted local image. The purpose of the mirroring processing is to improve training effect and speed. A face may be regarded to be left and right symmetrical. To improve the training speed, the other side may be predicted through the mirroring processing. For example, a blinking classifier is trained to predict a left eye and a right eye at the same time, and learning is performed after the mirroring processing, not only to increase diversity of samples, but also to improve the training effect to some extent. Secondly, an HOG feature of a local region of each sample is extracted. To prevent some features from being excessively large, standardized processing may be performed on HOG features obtained through computation. In a standardizing method, an average value may be subtracted from a sample value and the difference is divided by a standard deviation. A corresponding formula is as follows: $(X-\mu)/\sigma$, where X represents the sample value, $\mu$ represents the average value, and $\sigma$ represents the standard deviation. The standardizing method can resolve a problem about value stability and can prevent some features from being excessively large. Finally, the HOG features in the labeled sample are learned, and the rule therein is learned, until a type of a new sample can be predicted accurately according to the learned rule. As shown in FIG. 11, the SVM constructs a hyper-plane during a learning process, to obtain a maximum interval between two types of samples, and a larger interval causes a corresponding prediction effect to be more accurate. If the sample is two-dimensional, it is a straight line, if the sample is three-dimensional, it is a plane, and if the sample is more than three-dimensional, it is a super-plane.

Step 1004: Determine the third deformation coefficient corresponding to the texture feature according to the identification result.

In an embodiment, the trained classifier is used to predict the extracted local region according to the texture feature, to output a corresponding identification result, and the third deformation coefficient corresponding to the texture feature is determined according to the identification result. Regarding a dichotomous issue, output results are two values, that is, 1 and −1 (corresponding to true and false). For example, whether the eyes are closed is predicted, if the output result is 1, it indicates that the eyes are closed, and if the output result is −1, it indicates that the eyes are opened. The deformation coefficient of the corresponding eye closing may be set to 0, and the deformation coefficient of the corresponding eye opening may be set to 100.

In another embodiment, to obtain a more precise prediction result, a probability model may be trained to indicate a probability that the output is true, rather than only outputting 1 and −1, so as to improve prediction accuracy by adjusting a threshold subsequently. For example, regarding some users with very small eyes, HOG features about eye opening and closing are not very obvious, and error determining may easily occur during prediction. Therefore, if a probability value of eye closing is obtained, the prediction accuracy may be improved by adjusting the threshold of eye closing. For example, an original threshold of eye closing is 60%, that is, when the probability value of eye closing is predicted to be larger than 60%, the eyes are determined to be closed. Regarding a user with very small eyes, the threshold of eye closing may be adjusted. For example, the threshold may be adjusted to be 70%. In this way, only when the probability of eye closing is predicted to be greater than 70%, the eyes are determined to be closed, that is, the condition for determining eye closing is stricter. In an embodiment, the probability of output results can be predicted by using the following formula: $P(y=1/|f)=1/[1+ \exp(Af+B)]$, where A and B are parameters obtained through fitting, f is an output result of an original SVM classifier, and P is a probability that the obtained result is predicted to be true.

Figure 12:
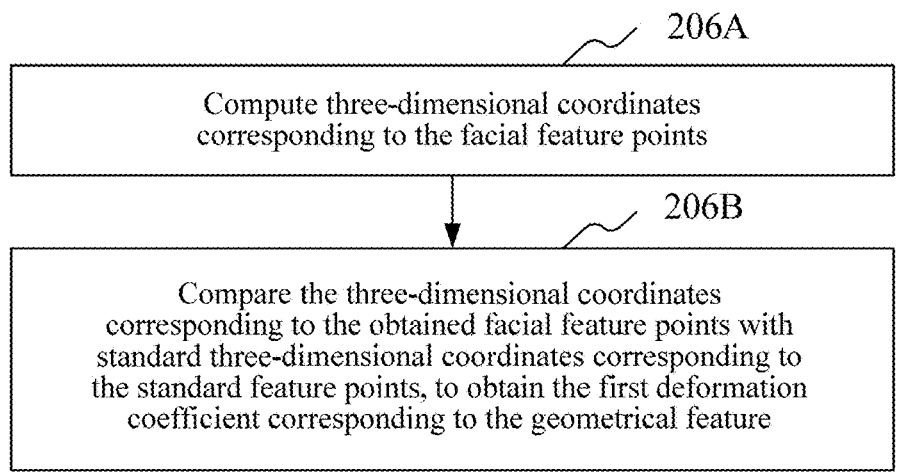
FIG. 12 is a flowchart of a method for comparing facial feature points with standard feature points to obtain a first deformation coefficient corresponding to a geometrical feature according to an embodiment.

As shown in FIG. 12, in an embodiment, step 206, that is, comparing facial feature points with standard feature points to obtain a first deformation coefficient corresponding to a geometrical feature, includes the following steps:

Step 206A: Compute three-dimensional coordinates corresponding to the facial feature points.

In an embodiment, a real face is interfered by rigid parameters such as different angles, displacements, and scalings. To better obtain the first deformation coefficient corresponding to the geometrical feature, an obtained 2D facial image is converted to a 3D image of a face, then comparison is performed, and specifically, the three-dimensional coordinates corresponding to the facial feature points are compared with the three-dimensional coordinates corresponding to the standard feature points. Therefore, the three-dimensional coordinates corresponding to the facial feature points need to be computed. First, two-dimensional coordinates corresponding to the facial feature points are obtained, and then, a 3D reconstruction technology is used to obtain three-dimensional coordinates corresponding to the two-dimensional coordinates of the facial feature points. In an embodiment, a 3D point distribution model can be described by a parameter $p=[s, R, q, t]$, where s represents a scaling parameter, R represents a model rotation parameter, t represents a 2D displacement parameter, and q represents a 3D flexible parameter. The specific implementation formula is as follows: $x_i=s \cdot R(\bar{x}_i+\Phi_i q)+t$, where $x_i=(x, y)$ represents two-dimensional coordinates of the $i^{th}$ facial feature point, $\bar{x}_i=(X,Y,Z)$ represents three-dimensional coordinates corresponding to the $i^{th}$ facial feature point, $\Phi_i$ represents the ith feature vector obtained from a training set for describing a flexible shape linear change, $\Phi_i$ may be regarded as a base of a flexible shape change, and q is a change parameter. Therefore, according to the known parameter p=[s, R, q, t], the foregoing formula may be used to compute the three-dimensional coordinates corresponding to the facial feature points. According to the parameter p=[s, R, q, t], min J(p)/p may be obtained by optimizing the following cost function:

$$J(p) = \frac{1}{2n}\sum_{i=1}^{n} \|s \cdot R(\bar{x}_i + \Phi_i q) + t - y_i\|_2^2,$$

where the subscript 2 represents a vector norm, and the norm 2 of the vector refers to a square root of a sum of each square in the vector. That is, when the target function J(p) has a minimum value, the value corresponding to the parameter p=[s, R, q, t] is a determined parameter value. That is, the three-dimensional coordinates corresponding to the facial feature points are scaled, rotated, displaced, and locally deformed, and then projected, to obtain that a corresponding parameter obtained when a sum of squared errors between the two-dimensional coordinates and the actual two-dimensional coordinates $y_i$ obtained through the previous computation is the minimum is the parameter p=[s, R, q, t] to be determined. Herein, all common optimization methods, such as a gradient descent method and a Newton method, can be used to find solutions.

In an embodiment, a computation process using a gradient descent method is as follows: (1) initializing a deformation parameter p=[s, R, q, t] to be 0; (2) obtaining a 3D flexible shape of a model by using the following formula: $x=\bar{x}+\Phi q$; (3) obtaining a 2D projection shape after rigid conversion by using the following formula: $\hat{y}=s \cdot R(\bar{x}+\Phi q)$ where $\hat{y}$ is a 2D projection coordinate, s is a scaling parameter, R is a model rotation parameter, and $\Phi$ may be regarded as a base of a flexible shape change, and q is a changed parameter; (4) obtaining a partial derivative $\Delta p=\partial J(p)/\partial p$ for the parameter vector p in J(p); (5) updating the parameter p: $p=p-\alpha \cdot \Delta p$, where $\alpha$ is referred to as a learning rate, and for example, $\alpha=0.5$; and (6) computing whether a distance (residual) $\varepsilon=\|\hat{y}-y\|$ between the 2D projection coordinate $\hat{y}$ and the detected two-dimensional coordinate y of the face is converged, that is, determining whether $\varepsilon$ is smaller than a certain threshold (for example, 0.001), if it is converged, the parameter p obtained through computation is an optimized value, and otherwise, the foregoing step (2) is performed.

Step 206B: Compare the three-dimensional coordinates corresponding to the facial feature points with standard three-dimensional coordinates corresponding to the standard feature points, to obtain the first deformation coefficient corresponding to the geometrical feature.

In an embodiment, after the three-dimensional coordinates of the facial feature points are obtained through computation, the three-dimensional coordinates obtained through computation are compared with the three-dimensional feature points corresponding to the standard feature points to obtain change values of parts of the face relative to the standard three-dimensional coordinates, for example, a displacement change of the eyebrows relative to the standard three-dimensional coordinates and a width change of the mouth relative to the standard three-dimensional coordinates. The corresponding deformation coefficients are determined according to the obtained change values, to further determine the first deformation coefficient corresponding to the geometrical feature.

Figure 13:
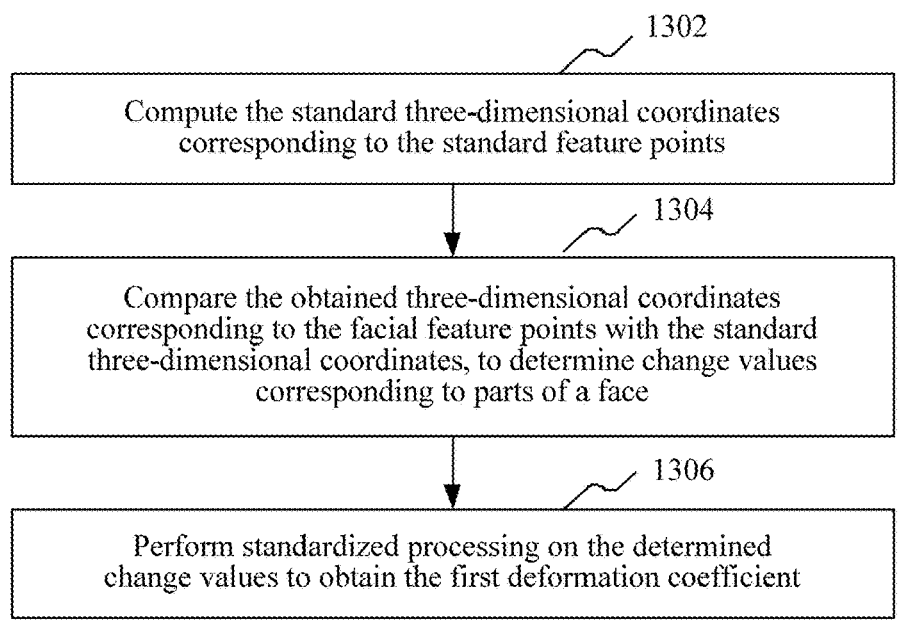
FIG. 13 is a flowchart of a method for comparing three-dimensional coordinates corresponding to facial feature points with standard three-dimensional coordinates corresponding to standard feature points, to obtain a first deformation coefficient corresponding to a geometrical feature according to an embodiment.

As shown in FIG. 13, in an embodiment, step 206B, that is, comparing the three-dimensional coordinates corresponding to the facial feature points with standard three-dimensional coordinates corresponding to the standard feature points, to obtain the first deformation coefficient corresponding to the geometrical feature, includes the following steps:

Step 1302: Compute the standard three-dimensional coordinates corresponding to the standard feature points.

In an embodiment, to compare the three-dimensional coordinates corresponding to the facial feature points with the three-dimensional coordinates corresponding to the standard feature points, first, the standard three-dimensional coordinates corresponding to the standard feature points need to be computed.

The standard feature points refer to standard feature points corresponding to a neutral face. Therefore, the standard three-dimensional coordinates are actually the three-dimensional coordinates corresponding to the neutral face. The neutral face refers to a face state of a person without any expressions.

The standard three-dimensional coordinates may be computed by using an intermediate value-based online prediction algorithm or certainly by using another method. For example, the three-dimensional coordinates that are input and that are corresponding to the neutral face may be directly used as standard three-dimensional coordinates, and the method for computing standard three-dimensional coordinates is not limited herein. For example, the intermediate value-based online prediction method is described below. Specifically, video data (such as 100 frames of video data) in a window during a period of time is obtained, three-dimensional coordinates corresponding to facial feature points in each frame of video in the 100 frames of video data are obtained, the three-dimensional coordinates of the facial feature points at the same position are sorted in an ascending or descending order, and intermediate values are used as the standard three-dimensional coordinates. The method is simple assumption, that is, a user has no expressions for most of the time. Therefore, after the three-dimensional coordinates are sorted in an order, the data at two ends is seen as special states with expressions, and the intermediate values refer to neutral states without expressions. For example, in the obtained continuous video data, each frame of video data is corresponding to a facial image, facial feature points in the facial image are extracted, three-dimensional coordinates corresponding to the facial feature points are computed, a quantity of facial feature points corresponding to each facial image is the same, and the three-dimensional coordinates corresponding to the facial feature points at the same position are sorted. For example, the three-dimensional coordinates (X, Y, Z) of a feature point corresponding to a mouth are sorted, and the extracted video data is by default in an expressionless state in most cases. Therefore, after the three-dimensional coordinates are sorted, the intermediate values are used as standard three-dimensional coordinates. By analog, the standard three-dimensional coordinates corresponding to all feature points are obtained.

Step 1304: Compare the obtained three-dimensional coordinates corresponding to the facial feature points with the standard three-dimensional coordinates, to determine change values corresponding to parts of a face.

In an embodiment, after the standard three-dimensional coordinates corresponding to the standard feature points are obtained through computation, the standard three-dimensional coordinates are used as reference values to compute changes of facial feature points in a face of a user relative to the standard three-dimensional coordinates, to further determine change values corresponding to the parts, for example, displacement changes of eyebrows and a mouth.

Step 1306: Perform standardized processing on the determined change values to obtain the first deformation coefficient.

In an embodiment, to measure the obtained values using the same standard, after the change values of the parts of the face relative to the neutral face are obtained, standardized processing needs to be performed on the change values. For example, after the relative displacement of the eyebrows is obtained, the displacement is standardized to be between 0 and 1. In a standardizing method, a maximum value may be simply divided, $\theta'=\theta/\max(\theta)$, where $\theta$ represents a value before standardizing and $\max(\theta)$ represents a corresponding maximum value. For example, if an obtained eyebrow raising displacement is 1 mm, and a maximum eyebrow raising displacement is 5 mm according to an experience value, a value corresponding to the standardized eyebrows is 0.2. Since a value range of a deformation coefficient Blendshape driving the three-dimensional virtual object is 0-100, after the standardized processing is performed on a change value, the change value may be multiplied by 100 to be used as the corresponding deformation coefficient.

Figure 14:
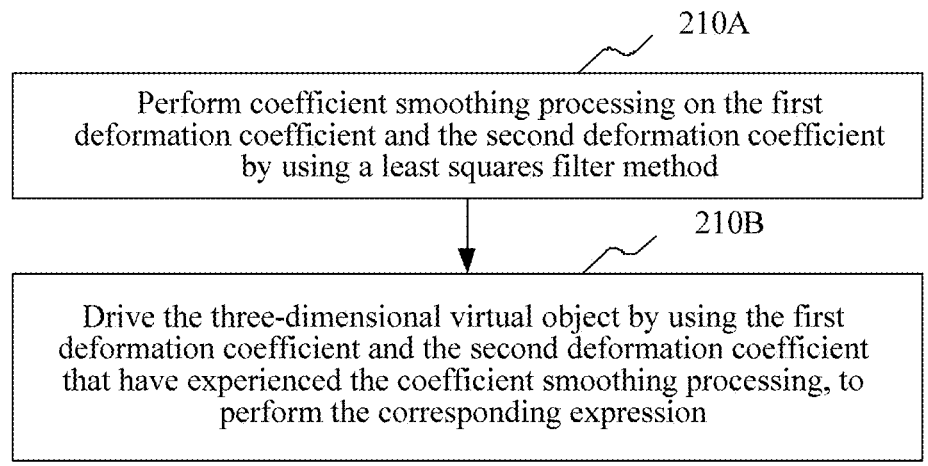
FIG. 14 is a flowchart of a method for driving a three-dimensional virtual object according to a first deformation coefficient and a second deformation coefficient to perform a corresponding expression according to an embodiment.

As shown in FIG. 14, in an embodiment, step 210, that is, driving a three-dimensional virtual object according to the first deformation coefficient and the second deformation coefficient to perform a corresponding expression, includes the following steps:

Step 210A: Perform coefficient smoothing processing on the first deformation coefficient and the second deformation coefficient by using a least squares filter method.

Figure 15:
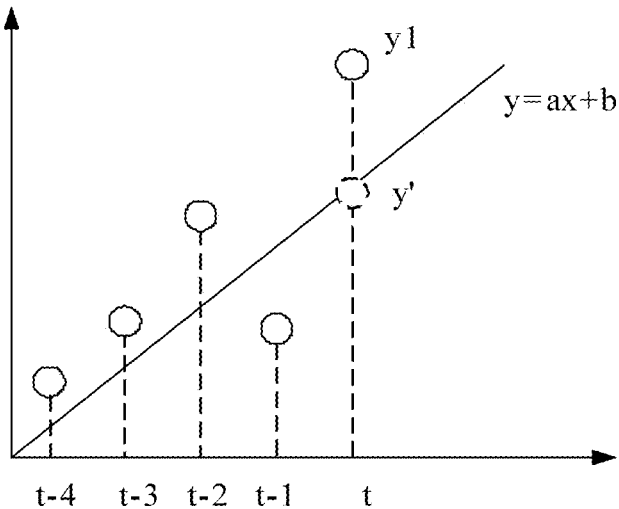
FIG. 15 is a schematic diagram of a smoothing principle of a least squares filter according to an embodiment.
Figure 16:
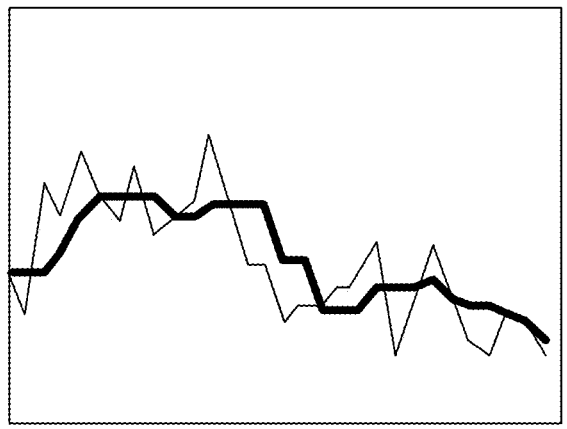
FIG. 16 is schematic comparative diagram of a state before smoothing processing and a state after smoothing processing according to an embodiment.

In an embodiment, since extracted two-dimensional coordinates of facial feature points have errors, three-dimensional coordinates obtained through computation according to the two-dimensional coordinates have local jitter between video frames, causing a predicted deformation coefficient to be unsmooth and seriously affecting animation effects. Therefore, smoothing processing needs to be further performed on the obtained deformation coefficient. In an embodiment, coefficient smoothing processing is performed on the first deformation coefficient and the second deformation coefficient by using a least squares filter method. The specific processing method is as follows. As shown in FIG. 15, if a filter processing window has 5 frames, 4 frames of historical data needs to be reserved. It is assumed that a coefficient value at a moment t is yl, a straight line $y=ax+b$ is fit by using a least square method according to the historical data at moments t, t-1, t-2, t-3, and t-4, and parameters a and b are obtained. The point y' falling on the straight line at the moment t is a result output through the filter, the filter is used repeatedly for each frame, and the historical data can be updated to obtain very smooth coefficients. FIG. 16 shows an effect of smoothing a head rotation coefficient in an X direction, where a black thin line represents an original coefficient and is jittering seriously, and a black thick line represents a result after the smoothing processing and is smoother relatively.

Step 210B: Drive the three-dimensional virtual object by using the first deformation coefficient and the second deformation coefficient that have experienced the coefficient smoothing processing, to perform the corresponding expression.

Figure 17:
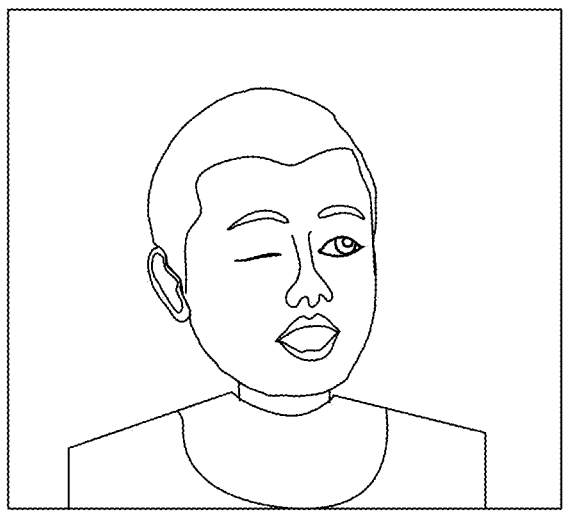
FIG. 17 is a schematic diagram of a three-dimensional virtual object performing a corresponding expression according to an embodiment.

In an embodiment, the three-dimensional virtual object refers to network animation (Avatar). The three-dimensional virtual object may be a cartoon character or a real character that is really restored. The three-dimensional virtual object is driven by using the first deformation coefficient and the second deformation coefficient that have experienced the coefficient smoothing processing, to perform the corresponding expression. In an embodiment, a deformation coefficient may be represented by a Blendshape. In the process for identifying a facial expression, values corresponding to Blendshapes in a face are determined, and a real expression of a person is formed by combining the values of the Blendshapes. Then, according to the values of the Blendshapes, the three-dimensional virtual object is driven to perform a corresponding expression, that is, the captured expression of the real face is restored to the face of the three-dimensional virtual object, to implement corresponding facial animation. FIG. 17 is an eye blinking expression (a right eye closed) of a three-dimensional virtual object according to an embodiment.

Figure 18:
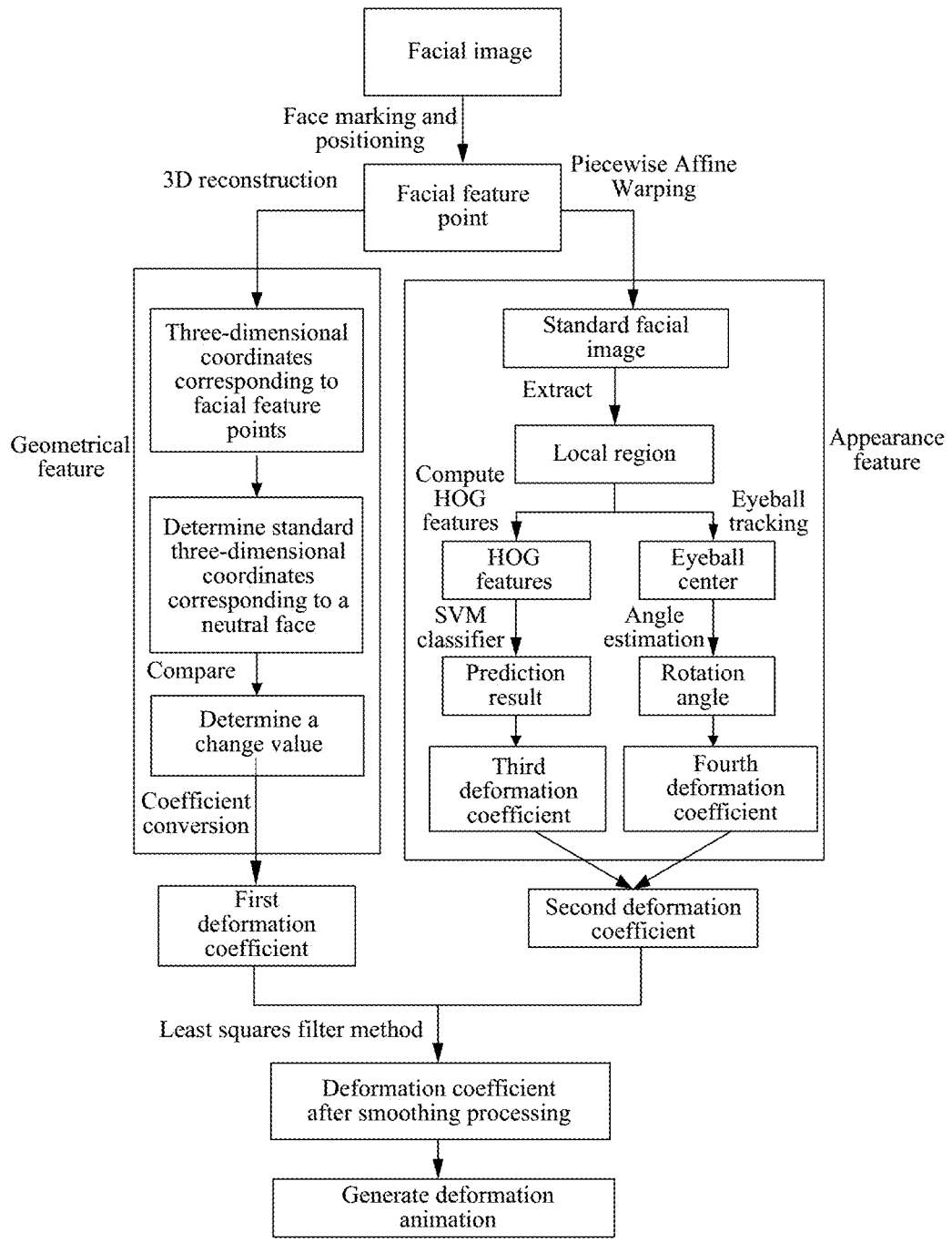
FIG. 18 is an architectural diagram of a procedure for facial animation implementation according to an embodiment.

FIG. 18 is an architectural diagram of a procedure for facial animation implementation according to an embodiment. First, a face marking and positioning technology is used to extract captured facial feature points of a facial image. Then, a geometrical feature and an appearance feature are identified according to the facial feature points. A process for identifying the geometrical feature includes: using a 3D reconstruction technology to obtain the corresponding three-dimensional coordinates through computation according to the extracted two-dimensional coordinates of the facial feature points, obtaining standard three-dimensional coordinates corresponding to the neutral face through computation, comparing the three-dimensional coordinates with the standard three-dimensional coordinates corresponding to the neutral face to obtain change values corresponding to parts of a face, and converting the change values to standardized coefficients through coefficient conversion, to determine a corresponding deformation coefficient. A process for identifying the appearance feature includes: obtaining a standard facial image by using affine warping according to the facial feature points, then, extracting a local region from the facial image, on one hand, extracting HOG features of the local region through computation, and obtaining a corresponding prediction result by using a trained SVM classifier, to determine a third deformation coefficient; and on the other hand, performing eyeball tracking by using an eyeball tracking algorithm, to determine an eyeball center position, computing a rotation angle of an eyeball relative to a horizontal visual state according to the eyeball center position, and determining a fourth deformation coefficient according to the rotation angle. The third deformation coefficient and the fourth deformation coefficient form the second deformation coefficient corresponding to the appearance feature. Then, a least squares filter method is used to perform smoothing processing on the first deformation coefficient and the second deformation coefficient obtained through computation, and the three-dimensional virtual object is driven according to the first deformation coefficient and the second deformation coefficient that have experienced smoothing processing, to perform a corresponding expression, that is, generating deformation animation.

In an embodiment, a computer device is further provided. An internal structure of the computer device is shown in FIG. 1. The computer device includes a facial animation implementation apparatus, the facial animation implementation apparatus includes modules, and the modules may be all or partially implemented by software, hardware, or a combination thereof.

Figure 19:
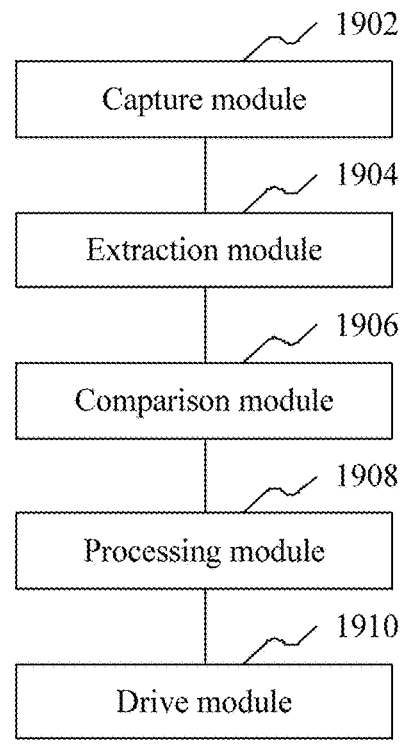
FIG. 19 is a structural block diagram of a facial animation implementation apparatus according to an embodiment.

As shown in FIG. 19, in an embodiment, a facial animation implementation apparatus is provided, and the apparatus includes:

a capture module 1902, configured to capture a facial image;

an extraction module 1904, configured to extract facial feature points in the facial image;

a comparison module 1906, configured to compare the facial feature points with standard feature points, to obtain a first deformation coefficient corresponding to a geometrical feature;

a processing module, configured to extract a local region according to the facial feature points for processing, to obtain a second deformation coefficient corresponding to an appearance feature; and a drive module 1910, configured to drive a three-dimensional virtual object according to the first deformation coefficient and the second deformation coefficient to perform a corresponding expression.

Figure 20:
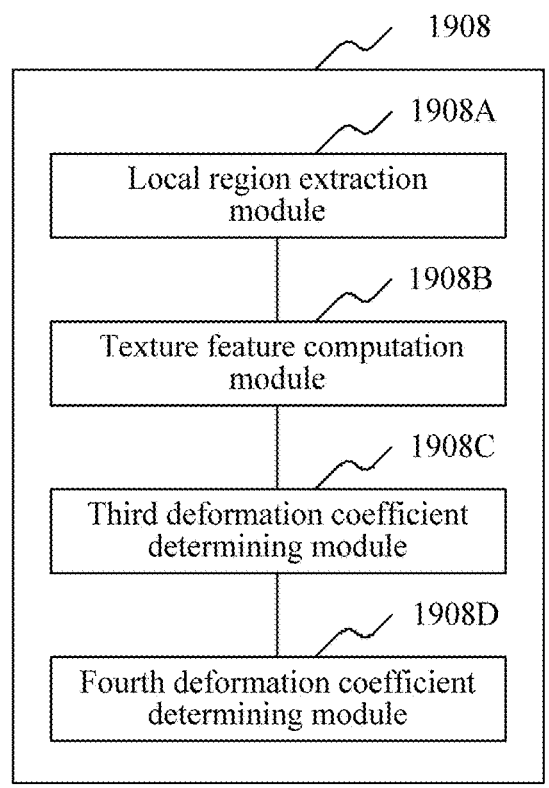
FIG. 20 is a structural block diagram of a processing module according to an embodiment.

As shown in FIG. 20, in an embodiment; the second deformation coefficient includes a third deformation coefficient and a fourth deformation coefficient. The processing module 1908 includes:

a local region extraction module 1908A, configured to extract the local region from the facial image according to the facial feature points;

a texture feature computation module 190813, configured to compute a texture feature corresponding to the local region;

a third deformation coefficient determining module 1908C, configured to determine the third deformation coefficient corresponding to the local region according to the texture feature; and a fourth deformation coefficient determining module 1908D, configured to determine an eyeball center position by using an eyeball tracking algorithm, compute a rotation angle of an eyeball relative to a horizontal visual state according to the eyeball center position, and determine the fourth deformation coefficient according to the rotation angle.

In an embodiment, the local region extraction module 1908A is further configured to convert the facial image to a standard facial image by using Piecewise Affine Warping according to the facial feature points, and extract the local region from the standard facial image.

In an embodiment, the third deformation coefficient determining module 1908C is further configured to determine an identification result corresponding to the local region by using a trained classifier according to the texture feature, where the classifier is obtained by learning a texture feature in a labeled sample, and determine the third deformation coefficient corresponding to the texture feature according to the identification result.

Figure 21:
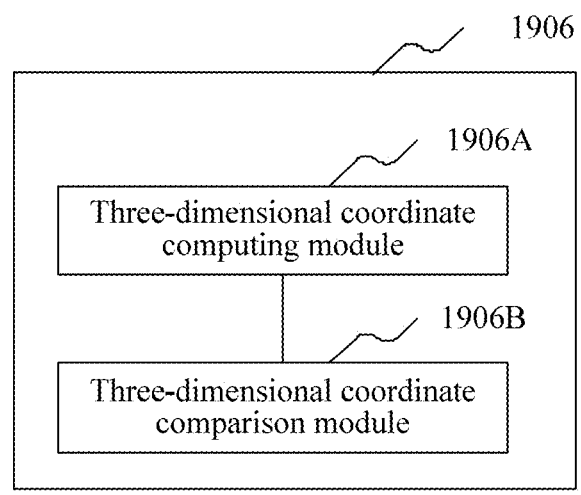
FIG. 21 is a structural block diagram of a comparison module according to an embodiment.

As shown in FIG. 21, in an embodiment, the comparison module 1906 includes:

a three-dimensional coordinate computing module 1906A, configured to compute three-dimensional coordinates corresponding to the facial feature points; and a three-dimensional coordinate comparison module 1906B, configured to compare the obtained three-dimensional coordinates corresponding to the facial feature points with standard three-dimensional coordinates corresponding to the standard feature points, to obtain the first deformation coefficient corresponding to the geometrical feature.

In an embodiment, the three-dimensional coordinate computing module 1906A is further configured to compute the standard three-dimensional coordinates corresponding to the standard feature points, compare the obtained three-dimensional coordinates corresponding to the facial feature points with the standard three-dimensional coordinates, to determine change values corresponding to parts of a face, and perform standardized processing on the determined change values to obtain the first deformation coefficient. In an embodiment, the drive module 1910 is further configured to perform coefficient smoothing processing on the first deformation coefficient and the second deformation coefficient by using a least squares filter method, and drive the three-dimensional virtual object by using the first deformation coefficient and the second deformation coefficient that have experienced the coefficient smoothing processing, to perform the corresponding expression.

In an embodiment, a computer device is provided. The computer device includes a memory and one or more processors. The memory stores computer-readable instructions, and the computer-readable instructions, when being executed by one or more processors, cause the one or more processors to perform the following steps: capturing a facial image; extracting facial feature points in the facial image; comparing the facial feature points with standard feature points, to obtain a first deformation coefficient corresponding to a geometrical feature; extracting a local region according to the facial feature points for processing, to obtain a second deformation coefficient corresponding to an appearance feature; and driving a three-dimensional virtual object according to the first deformation coefficient and the second deformation coefficient to perform a corresponding expression.

In an embodiment, the second deformation coefficient includes a third deformation coefficient and a fourth deformation coefficient, and the extracting, by the processors, a local region according to the facial feature points for processing, to obtain a second deformation coefficient corresponding to an appearance feature includes: extracting the local region from the facial image according to the facial feature points; computing a texture feature corresponding to the local region; determining the third deformation coefficient corresponding to the local region according to the texture feature; and determining an eyeball center position by using an eyeball tracking algorithm, computing a rotation angle of an eyeball relative to a horizontal visual state according to the eyeball center position, and determining the fourth deformation coefficient according to the rotation angle.

In an embodiment, the extracting, by the processors, the local region from the facial image according to the facial feature points includes: converting the facial image to a standard facial image by using Piecewise Affine Warping according to the facial feature points; and extracting the local region from the standard facial images.

In an embodiment, the determining, by the processors, the third deformation coefficient corresponding to the local region according to the texture feature includes: determining an identification result corresponding to the local region by using a trained classifier according to the texture feature, where the classifier is obtained by learning a texture feature in a labeled sample; and determining the third deformation coefficient corresponding to the texture feature according to the identification result.

In an embodiment, the comparing, by the processors, the facial feature points with standard feature points, to obtain a first deformation coefficient corresponding to a geometrical feature includes: computing three-dimensional coordinates corresponding to the facial feature points; and comparing the obtained three-dimensional coordinates corresponding to the facial feature points with standard three-dimensional coordinates corresponding to the standard feature points, to obtain the first deformation coefficient corresponding to the geometrical feature.

In an embodiment, the comparing, by the processors, the obtained three-dimensional coordinates corresponding to the facial feature points with standard three-dimensional coordinates corresponding to the standard feature points, to obtain the first deformation coefficient corresponding to the geometrical feature includes: computing the standard three-dimensional coordinates corresponding to the standard feature points; comparing the obtained three-dimensional coordinates corresponding to the facial feature points with the standard three-dimensional coordinates, to determine change values corresponding to parts of a face; and performing standardized processing on the determined change values to obtain the first deformation coefficient.

In an embodiment, the driving, by the processors, a three-dimensional virtual object according to the first deformation coefficient and the second deformation coefficient to perform a corresponding expression includes: performing coefficient smoothing processing on the first deformation coefficient and the second deformation coefficient by using a least squares filter method; and driving the three-dimensional virtual object by using the first deformation coefficient and the second deformation coefficient that have experienced the coefficient smoothing processing, to perform the corresponding expression.

In an embodiment, one or more computer-readable non-volatile storage mediums storing computer-readable instructions are provided. The computer-readable instructions, when being executed by one or more processors, cause the one or more processors to perform the following steps: capturing a facial image; extracting facial feature points in the facial image; comparing the facial feature points with standard feature points, to obtain a first deformation coefficient corresponding to a geometrical feature; extracting a local region according to the facial feature points for processing, to obtain a second deformation coefficient corresponding to an appearance feature; and driving a three-dimensional virtual object according to the first deformation coefficient and the second deformation coefficient to perform a corresponding expression.

In an embodiment, the second deformation coefficient includes a third deformation coefficient and a fourth deformation coefficient, and the extracting, by the processors, a local region according to the facial feature points for processing, to obtain a second deformation coefficient corresponding to an appearance feature includes: extracting the local region from the facial image according to the facial feature points; computing a texture feature corresponding to the local region; determining the third deformation coefficient corresponding to the local region according to the texture feature; and determining an eyeball center position by using an eyeball tracking algorithm, computing a rotation angle of an eyeball relative to a horizontal visual state according to the eyeball center position, and determining the fourth deformation coefficient according to the rotation angle.

In an embodiment, the extracting, by the processors, the local region from the facial image according to the facial feature points includes: converting the facial image to a standard facial image by using Piecewise Affine Warping according to the facial feature points; and extracting the local region from the standard facial image.

In an embodiment, the determining, by the processors, the third deformation coefficient corresponding to the local region according to the texture feature includes: determining an identification result corresponding to the local region by using a trained classifier according to the texture feature, where the classifier is obtained by learning a texture feature in a labeled sample; and determining the third deformation coefficient corresponding to the texture feature according to the identification result.

In an embodiment, the comparing, by the processors, the facial feature points with standard feature points, to obtain a first deformation coefficient corresponding to a geometrical feature includes: computing three-dimensional coordinates corresponding to the facial feature points; and comparing the obtained three-dimensional coordinates corresponding to the facial feature points with standard three-dimensional coordinates corresponding to the standard feature points, to obtain the first deformation coefficient corresponding to the geometrical feature.

In an embodiment, the comparing, by the processors, the obtained three-dimensional coordinates corresponding to the facial feature points with standard three-dimensional coordinates corresponding to the standard feature points, to obtain the first deformation coefficient corresponding to the geometrical feature includes: computing the standard three-dimensional coordinates corresponding to the standard feature points; comparing the obtained three-dimensional coordinates corresponding to the facial feature points with the standard three-dimensional coordinates, to determine change values corresponding to parts of a face; and performing standardized processing on the determined change values to obtain the first deformation coefficient.

In an embodiment, the driving, by the processors, a three-dimensional virtual object according to the first deformation coefficient and the second deformation coefficient to perform a corresponding expression includes: performing coefficient smoothing processing on the first deformation coefficient and the second deformation coefficient by using a least squares filter method; and driving the three-dimensional virtual object by using the first deformation coefficient and the second deformation coefficient that have experienced the coefficient smoothing processing, to perform the corresponding expression.

It should be understood that although the steps in the embodiments of this application are not necessarily performed in an order indicated by the step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that some or all procedures in the method in the foregoing embodiments may be implemented by a computer-readable instruction instructing related hardware, the program may be stored in a non-volatile computer-readable storage medium, and when the program is executed, the procedures in the foregoing method embodiments may be implemented. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAIVI), a memory Bus (Rambus) direct RAM (RDRAM), a direct memory bus dynamic RAM (DRDRAM), and a memory bus dynamic RAM (RDRAM). The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments show only several implementations of this application, and descriptions thereof are in detail, but shall not be understood as limiting the patent scope of this application. It should be noted that various changes and improvements may further be made by a person of ordinary skill in the art without departing from the idea of this application, and these changes and improvements all fall within the protection scope of this application. Therefore, the protection scope of this application shall be subject to the appended claims.

What is claimed is:

1. A facial animation implementation method, performed at a computer device having one or more processors and memory storing a plurality of programs to be executed by the one or more processors, the method comprising:
    capturing, by the computer device, a facial image of a person;
    extracting, by the computer device, facial feature points in the facial image;
    comparing, by the computer device, the facial feature points with corresponding standard feature points of a neutral face, to obtain a first deformation coefficient corresponding to a geometrical feature;
    extracting, by the computer device, a local region from the facial image according to the facial feature points for processing, to obtain a second deformation coefficient corresponding to an appearance feature by:
    determining, by the computer device, the second deformation coefficient corresponding to the local region according to a texture feature, including:
        determining, by the computer device, an identification result corresponding to the local region by using a trained classifier according to the texture feature, wherein the classifier is obtained by learning the texture feature in a labeled sample; and
        determining, by the computer device, the second deformation coefficient corresponding to the texture feature according to the identification result;
    performing, by the computer device, coefficient smoothing processing on the first deformation coefficient and the second deformation coefficient by using a least squares filter method that includes a filter processing window having more than one frame; and
    driving, by the computer device, a three-dimensional virtual object by using the first deformation coefficient and the second deformation coefficient that have been smoothed, to perform a corresponding expression represented by the facial image of the person.

2. The method according to claim 1, wherein the second deformation coefficient comprises a third deformation coefficient and a fourth deformation coefficient; and
    the extracting, by the computer device, a local region from the facial image according to the facial feature points for processing, to obtain a second deformation coefficient corresponding to an appearance feature comprises:
    extracting, by the computer device, the local region from the facial image according to the facial feature points;
    computing, by the computer device, the texture feature corresponding to the local region;
    determining, by the computer device, the third deformation coefficient corresponding to the local region according to the texture feature; and
    determining, by the computer device, an eyeball center position by using an eyeball tracking algorithm, computing a rotation angle of an eyeball relative to a horizontal visual axis according to the eyeball center position, and determining the fourth deformation coefficient according to the rotation angle, wherein the eyeball center position comprises a position c* of a center of the eyeball corresponding to a maximum sum of dot products of di $$c^* = \underset{c}{\mathrm{argmax}}\left\{\frac{1}{N}\sum_{i=1}^{N}(d_i^T g_i)^2\right\},$$

and gi: where gi is a gradient vector of a position xi, di is a vector from c* to xi, and $d_i^T$ represents a transpose matrix.

3. The method according to claim 1, wherein the extracting, by the computer device, the local region from the facial image according to the facial feature points comprises:
    converting, by the computer device, the facial image to a standard facial image by using Piecewise Affine Warping according to the facial feature points; and
    extracting, by the computer device, the local region from the standard facial image.

4. The method according to claim 1, wherein the comparing, by the computer device, the facial feature points with standard feature points, to obtain a first deformation coefficient corresponding to a geometrical feature comprises:
    computing, by the computer device, three-dimensional coordinates corresponding to the facial feature points; and
    comparing, by the computer device, the computed three-dimensional coordinates corresponding to the facial feature points with three-dimensional coordinates corresponding to the standard feature points of the neutral face, to obtain the first deformation coefficient corresponding to the geometrical feature.

5. The method according to claim 4, wherein the comparing, by the computer device, the obtained three-dimensional coordinates corresponding to the facial feature points with three-dimensional coordinates corresponding to the standard feature points of the neutral face, to obtain the first deformation coefficient corresponding to the geometrical feature comprises:

computing, by the computer device, the three-dimensional coordinates corresponding to the standard feature points of the neutral face;

comparing, by the computer device, the computed three-dimensional coordinates corresponding to the facial feature points with the three-dimensional coordinates, to determine change values corresponding to parts of a face; and performing processing on the determined change values to obtain the first deformation coefficient.

6. A computer device, comprising one or more processors, memory coupled to the one or more processors and a plurality of programs stored in the memory that, when executed by the one or more processors, cause the computer device to perform a plurality of operations comprising:

capturing, by the computer device, a facial image of a person;

extracting, by the computer device, facial feature points in the facial image;

comparing, by the computer device, the facial feature points with corresponding standard feature points of a neutral face, to obtain a first deformation coefficient corresponding to a geometrical feature;

extracting, by the computer device, a local region from the facial image according to the facial feature points for processing, to obtain a second deformation coefficient corresponding to an appearance feature by:

determining, by the computer device, the second deformation coefficient corresponding to the local region according to a texture feature, including:

determining, by the computer device, an identification result corresponding to the local region by using a trained classifier according to the texture feature, wherein the classifier is obtained by learning the texture feature in a labeled sample; and determining, by the computer device, the second deformation coefficient corresponding to the texture feature according to the identification result;

extracting, by the computer device, a local region according to the facial feature points for processing, to obtain a second deformation coefficient corresponding to an appearance feature;

performing, by the computer device, coefficient smoothing processing on the first deformation coefficient and the second deformation coefficient by using a least squares filter method that includes a filter processing window having more than one frame; and driving, by the computer device, a three-dimensional virtual object by using the first deformation coefficient and the second deformation coefficient that have been smoothed, to perform a corresponding expression represented by the facial image of the person.

7. The computer device according to claim 6, wherein the second deformation coefficient comprises a third deformation coefficient and a fourth deformation coefficient; and the extracting, by the computer device, a local region according to the facial feature points for processing, to obtain a second deformation coefficient corresponding to an appearance feature comprises:

extracting, by the computer device, the local region from the facial image according to the facial feature points;

computing, by the computer device, the texture feature corresponding to the local region;

determining, by the computer device, the third deformation coefficient corresponding to the local region according to the texture feature; and determining, by the computer device, an eyeball center position by using an eyeball tracking algorithm, computing a rotation angle of an eyeball relative to a horizontal visual axis according to the eyeball center position, and determining the fourth deformation coefficient according to the rotation angle, wherein the eyeball center position comprises a position c* of a center of the eyeball corresponding to a maximum sum of dot products of di $$c^* = \underset{c}{\operatorname{argmax}}\left\{\frac{1}{N}\sum_{i=1}^{N}(d_i^T g_i)^2\right\},$$

and gi: where gi is a gradient vector of a position xi, di is a vector from c* to xi, and $d_i^T$ represents a transpose matrix.

8. The computer device according to claim 7, wherein the extracting, by the computer device, the local region from the facial image according to the facial feature points comprises:

converting, by the computer device, the facial image to a standard facial image by using Piecewise Affine Warping according to the facial feature points; and extracting, by the computer device, the local region from the standard facial image.

9. The computer device according to claim 6, wherein the comparing, by the computer device, the facial feature points with standard feature points, to obtain a first deformation coefficient corresponding to a geometrical feature comprises:

computing, by the computer device, three-dimensional coordinates corresponding to the facial feature points; and comparing, by the computer device, the obtained three-dimensional coordinates corresponding to the facial feature points with three-dimensional coordinates corresponding to the standard feature points of the neutral face, to obtain the first deformation coefficient corresponding to the geometrical feature.

10. The computer device according to claim 9, wherein the comparing, by the computer device, the obtained three-dimensional coordinates corresponding to the facial feature points with three-dimensional coordinates corresponding to the standard feature points of the neutral face, to obtain the first deformation coefficient corresponding to the geometrical feature comprises:

computing, by the computer device, the three-dimensional coordinates corresponding to the standard feature points of the neutral face;

comparing, by the computer device, the obtained three-dimensional coordinates corresponding to the facial feature points with the three-dimensional coordinates, to determine change values corresponding to parts of a face; and performing processing on the determined change values to obtain the first deformation coefficient.

11. A non-transitory computer readable storage medium storing a plurality of machine readable instructions in connection with a computer device having one or more processors, wherein the plurality of machine readable instructions, when executed by the one or more processors, cause the computer device to perform a plurality of operations including:

capturing, by the computer device, a facial image of a person;

extracting, by the computer device, facial feature points in the facial image;

comparing, by the computer device, the facial feature points with corresponding standard feature points of a neutral face, to obtain a first deformation coefficient corresponding to a geometrical feature;

extracting, by the computer device, a local region from the facial image according to the facial feature points for processing, to obtain a second deformation coefficient corresponding to an appearance feature by:

determining, by the computer device, the second deformation coefficient corresponding to the local region according to a texture feature, including:

determining, by the computer device, an identification result corresponding to the local region by using a trained classifier according to the texture feature, wherein the classifier is obtained by learning the texture feature in a labeled sample; and determining, by the computer device, the second deformation coefficient corresponding to the texture feature according to the identification result;

extracting, by the computer device, a local region according to the facial feature points for processing, to obtain a second deformation coefficient corresponding to an appearance feature;

performing, by the computer device, coefficient smoothing processing on the first deformation coefficient and the second deformation coefficient by using a least squares filter method that includes a filter processing window having more than one frame; and driving, by the computer device, a three-dimensional virtual object by using the first deformation coefficient and the second deformation coefficient that have been smoothed, to perform a corresponding expression represented by the facial image of the person.

12. The non-transitory computer readable storage medium according to claim 11, wherein the second deformation coefficient comprises a third deformation coefficient and a fourth deformation coefficient; and the extracting, by the computer device, a local region according to the facial feature points for processing, to obtain a second deformation coefficient corresponding to an appearance feature comprises:

extracting, by the computer device, the local region from the facial image according to the facial feature points;

computing, by the computer device, the texture feature corresponding to the local region;

determining, by the computer device, the third deformation coefficient corresponding to the local region according to the texture feature; and determining, by the computer device, an eyeball center position by using an eyeball tracking algorithm, computing a rotation angle of an eyeball relative to a horizontal visual state according to the eyeball center position, and determining the fourth deformation coefficient according to the rotation angle, wherein the eyeball center position comprises a position c* of a center of the eyeball corresponding to a maximum sum of dot products of di $$c^* = \underset{c}{\mathrm{argmax}}\left\{\frac{1}{N}\sum_{i=1}^{N}(d_i^T g_i)^2\right\},$$

and gi: where gi is a gradient vector of a position xi, di is a vector from c* to xi, and $d_i^T$ represents a transpose matrix.

13. The non-transitory computer readable storage medium according to claim 12, wherein the extracting, by the computer device, the local region from the facial image according to the facial feature points comprises:

converting, by the computer device, the facial image to a standard facial image by using Piecewise Affine Warping according to the facial feature points; and extracting, by the computer device, the local region from the standard facial image.

14. The non-transitory computer readable storage medium according to claim 11, wherein the comparing, by the computer device, the facial feature points with standard feature points, to obtain a first deformation coefficient corresponding to a geometrical feature comprises:

computing, by the computer device, three-dimensional coordinates corresponding to the facial feature points of the neutral face; and comparing, by the computer device, the obtained three-dimensional coordinates corresponding to the facial feature points with three-dimensional coordinates corresponding to the standard feature points of the neutral face, to obtain the first deformation coefficient corresponding to the geometrical feature.

* * * * *